(12) United States Patent
Wilson

(10) Patent No.: US 6,662,754 B1
(45) Date of Patent: Dec. 16, 2003

(54) REVERSIBLE DOG COAT

(76) Inventor: Pattimarie Wilson, 135 Weldon Farm Rd., Rowley, MA (US) 01969

(*) Notice: Subject to any disclaimer, the term of this patent is extended or adjusted under 35 U.S.C. 154(b) by 0 days.

(21) Appl. No.: 10/328,784

(22) Filed: Dec. 24, 2002

(51) Int. Cl.$^7$ .............................. A01K 13/00; B68C 5/00
(52) U.S. Cl. ........................................ 119/850; 54/79.2
(58) Field of Search ..................... 119/850; 54/79.1, 54/79.2, 79.4; D30/144, 145

(56) References Cited

U.S. PATENT DOCUMENTS

| | | | |
|---|---|---|---|
| 1,149,950 A | * 8/1915 | Rindskopf | 119/850 |
| 2,539,606 A | * 1/1951 | Bailey | 54/79.2 |
| 2,831,306 A | * 4/1958 | Brenton | 54/79.2 |
| D313,291 S | * 12/1990 | Shanley | D30/145 |
| 5,060,458 A | 10/1991 | Curtis | |
| 5,168,007 A | * 12/1992 | Levy | 54/79.1 |
| 6,089,194 A | 7/2000 | La Belle | |
| 6,138,611 A | * 10/2000 | Thielemann | 119/850 |
| 6,443,101 B1 | * 9/2002 | Fazio | 119/850 |
| D470,275 S | * 2/2003 | Lidis | D30/145 |

* cited by examiner

Primary Examiner—Charles T. Jordan
Assistant Examiner—Elizabeth Shaw
(74) Attorney, Agent, or Firm—Joseph R. Birkner

(57) ABSTRACT

A reversible dog coat for protecting a dog from the elements and for providing warmth and comfort is disclosed. The reversible dog coat comprises a material blank having an upper portion, a middle portion, and a lower portion. The upper portion has a first arm angularly protruding therefrom and a second arm angularly protruding from the upper portion and opposed to the first arm. The middle portion has a first leg horizontally protruding therefrom and a second leg horizontally protruding from the middle portion and opposed to the first leg. The material blank has four layers joined together by sewing; a first layer having a tightly woven exposed surface for weather and for wind resistance; a second layer having a tightly woven unexposed surface; a third layer having a highly insulative fill material disposed within a dead air space defined by the first layer and the second layer; and a fourth layer having a water resistant and an insulative property. The material blank is attachable to the dog with a hook and loop type fastener so that the first arm and the second arm adjustably encircles the neck of the dog, the first leg and the second leg adjustably encircles an abdomen of the dog between the front legs and the rear legs thereby covering the back of the dog from the neck to a tail, leaving the genitals of the dog exposed while allowing the reversible dog coat to be selectively reversed dependent upon the weather conditions and user preference.

20 Claims, 2 Drawing Sheets

REVERSIBLE DOG COAT

FIELD OF THE INVENTION

This invention relates generally to protective coats for animals such as dogs. More particularly, the present invention relates to a reversible insulated dog coat.

BACKGROUND OF THE INVENTION

Protective coats for animals such as dogs, cats, sheep, cows, and horses are available in the form of sweaters, vests, coats or blankets which, when worn by the animal, keeps it warm while providing protection from the elements. Depending upon their construction, such coats provide various levels of comfort, however the inventor recognized that available coats for dogs fail to provide adequate warmth during cold spells because of their poor insulating properties and they also fail to provide protection from rain or snow while simultaneously providing warmth to the dog without adding undue weight to the coat. Other problems associated with available dog coats, particularly those for small breed dogs with long hair such as Yorkshire Terriers, and for Chiwauwas, is that available coats on the market do not fit adequately, mat the hair of the dog, or twist and become tangled or, simply come off leaving the animal exposed to the elements and risking injury or illness from exposure. Furthermore, such coats can not adequately provide size adjustments to compensate for weight variations of the dog. This limitation requires the need to purchase another coat which will fit. Other coats made of plastic or rubber materials are not launderable or comfortably reversible and suffer from ultraviolet degradation over time making them useless and unaesthetically pleasing. Still other dog coats use thin batting as insulation which is inadequate for northern climates. Other dog coats use clasps or fabrics which chaff and irritate the sensitive skin of small dogs. Still other improper fitting dog coats are difficult to attach to a dog and interfere with a harness, collar or with a leash and are known to aggravate dogs with collapsed or partially collapsed tracheas which is a common condition in smaller dogs.

None of the above prior art devices disclose a dog coat which can keep a dog adequately warm in cold climates, a dog coat that is readily reversible without sacrificing comfort nor do they disclose a dog coat which can safely fit a small active dog without falling off.

In view of the above mentioned problems and limitations associated with conventional animal protective coats or the like, it was recognized by the present inventor that there is an unfulfilled need for an improved, light weight, attractive dog coat that simultaneously keeps the dog warm and protected from the harsh elements and one which is reversible and safe to use.

Accordingly, it becomes clear that there is a great need for a reversible dog coat that is size adjustable and one that provides warmth without bulk and a dog coat that provides protection from the elements which overcomes the disadvantages of the prior art protective coverings. Such a reversible dog coat should be one that is easy to use, is positively securable to an animal and is economically manufactured.

SUMMARY OF THE INVENTION

It is therefore an object of this invention to provide a dog coat which avoids the aforementioned problems of prior art devices.

It is another object of this invention to provide a dog coat that is easily reversible without sacrificing comfort, aesthetics and protection from the elements.

It is another object of this invention to provide a dog coat that has multiple layers of light weight materials which provide insulative and weather resistant properties.

It is a further object of this invention to provide a dog coat that is size expandable so that one dog coat can fit various sizes of dogs without modification.

It is a further object of this invention to provide a dog coat which may be manufactured from readily available materials by conventional manufacturing processes.

It is still a further object of this invention to provide a dog coat that is simple in design, simple to manufacture, low in cost, safe and is easy to use.

This invention results from the realization that there is a great need for a warm reversible protective coat for a dog which is size adjustable. The resulting invention provides such benefits.

According to a first aspect of the present invention, disclosed is a reversible dog coat for protecting a dog from the elements and for providing warmth and comfort. The reversible dog coat comprising a material blank, for ergonomically fitting about a neck and a back of the dog. The material blank has an upper portion, a middle portion, and a lower portion. The upper portion has a first arm angularly protruding therefrom and a second arm angularly protruding from the upper portion and oriented opposite to the first arm. The middle portion has a first leg horizontally protruding therefrom and a second leg horizontally protruding from the middle portion and oriented opposite to the first leg. The material blank has four layers joined together by sewing; a first layer having a tightly woven exposed surface for weather and for wind resistance; a second layer having a tightly woven unexposed surface; a third layer having a highly insulative fill material disposed within a dead air space defined by the first layer and the second layer; and a fourth layer having a water resistant and an insulative property. The material blank is attachable to the dog with a hook and loop type fastener so that the first arm and the second arm adjustably encircles the neck of the dog, the first leg and the second leg adjustably encircles an abdomen of the dog between the front legs and the rear legs thereby covering the back of the dog from the neck to a tail, leaving the genitals of the dog exposed while allowing the reversible dog coat to be selectively reversed dependent upon the weather conditions and user preference.

The second aspect, in accordance with the present invention, is a special case of the first aspect of this invention with additional features.

The third aspect of the present invention discloses a method of making a reversible dog coat.

DETAILED DESCRIPTION OF ILLUSTRATIVE EMBODIMENTS

Looking more particularly to the drawings, there is shown in FIGS. 1–4 an embodiment of a reversible dog coat, which is generally indicated at 10, according to an embodiment of the present invention.

Figure 1:
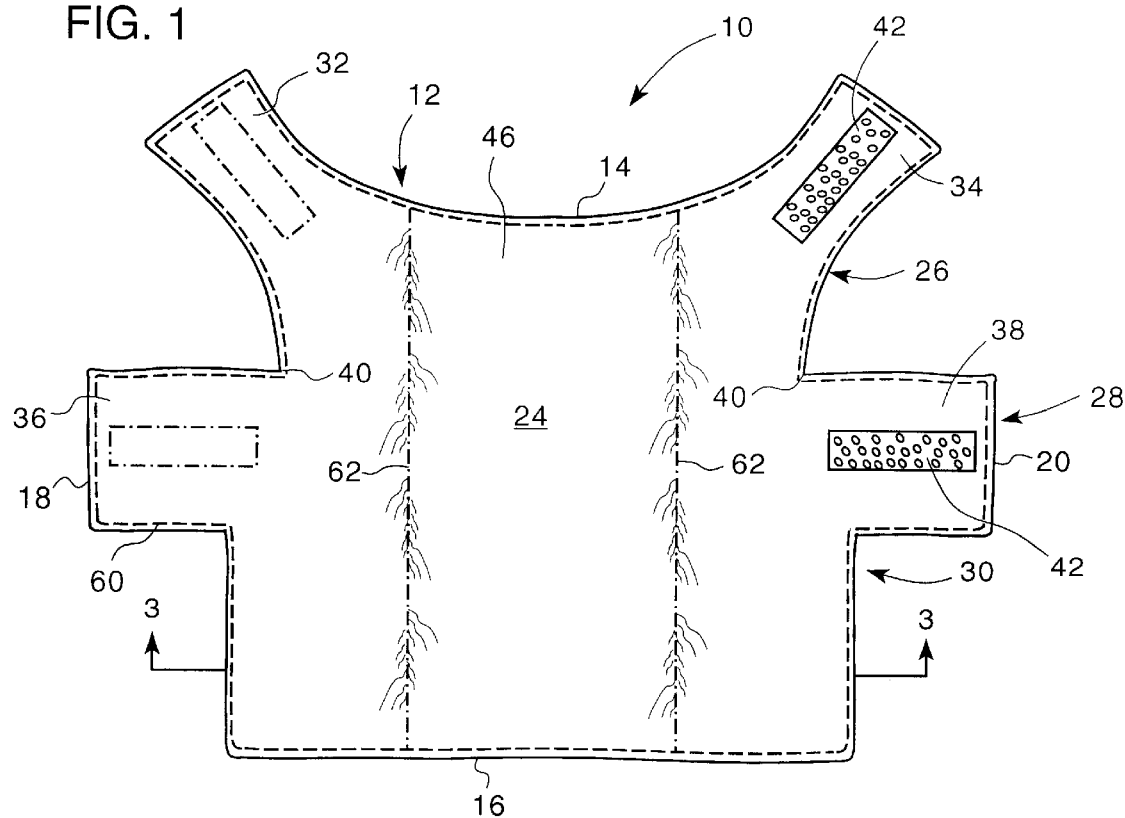
FIG. 1 is a top plan view of an embodiment of a reversible dog coat of the instant invention.
Figure 2:
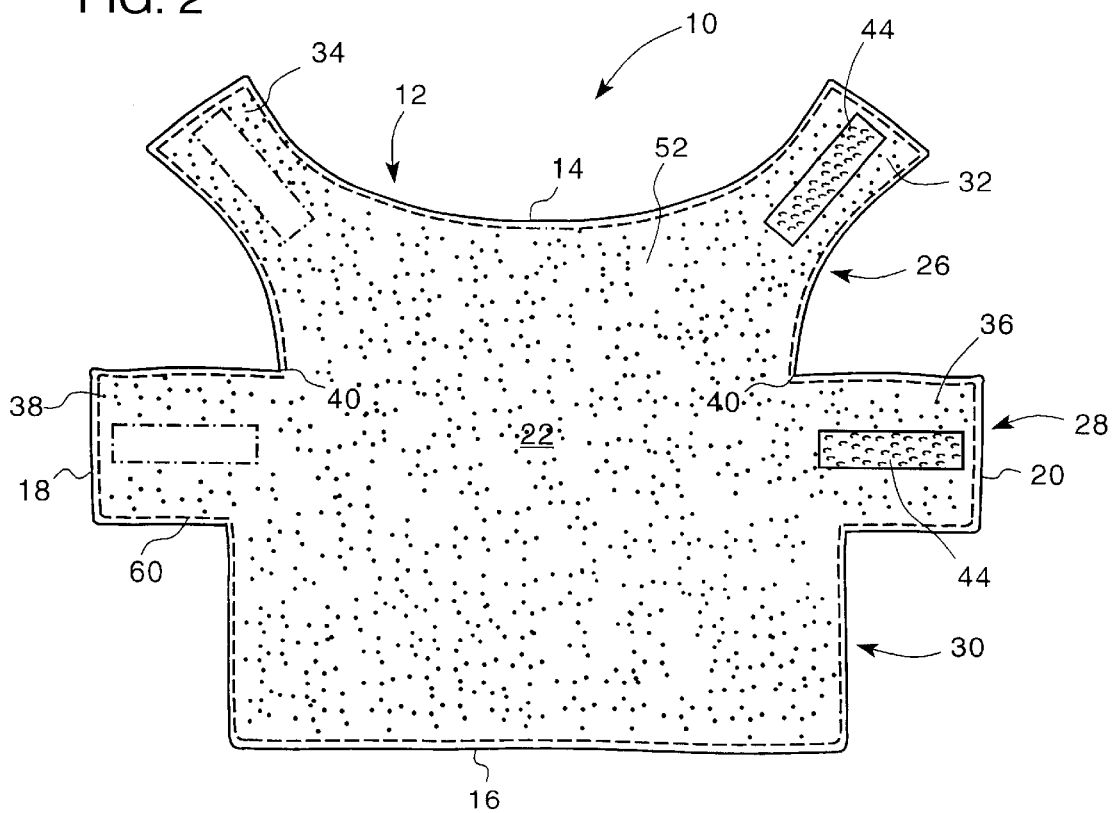
FIG. 2 is a bottom plan view of an embodiment of a reversible dog coat of the instant invention.
Figure 3:
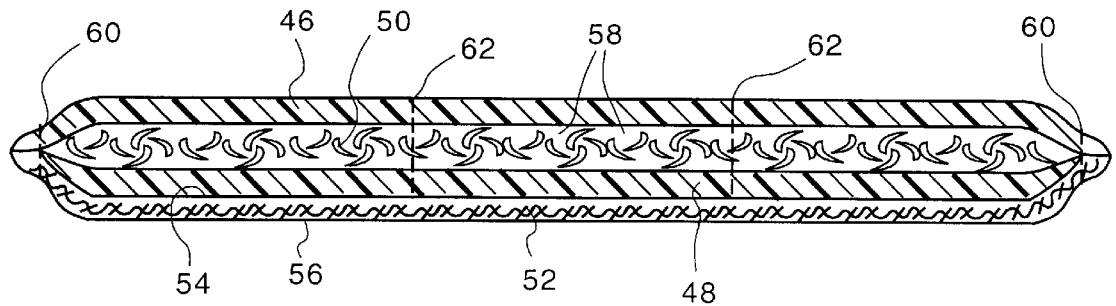
FIG. 3 is a cross sectional view taken along the lines 3—3 of FIG. 1 of an embodiment of a reversible dog coat of the instant invention.
Figure 4:
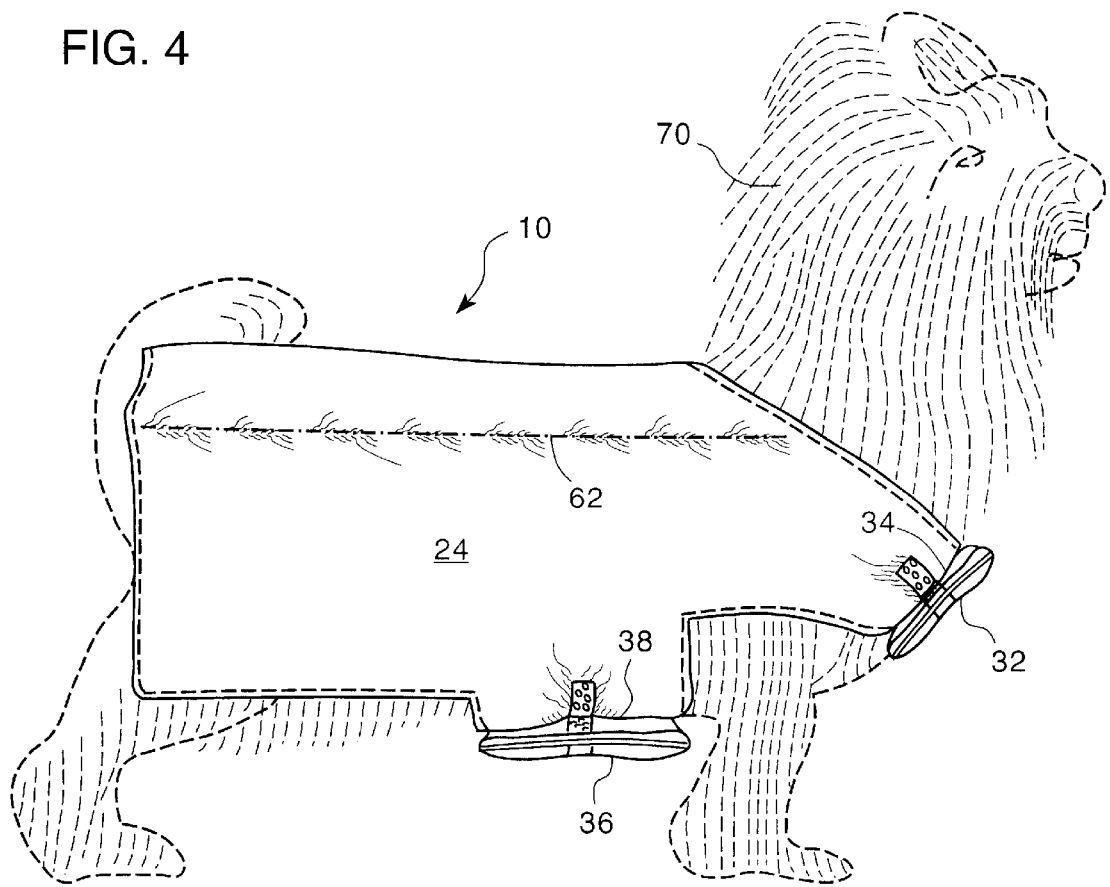
FIG. 4 is a left side elevation view of an embodiment of the instant invention showing a reversible dog coat with an outside surface visible as mounted on a dog which is shown in phantom.

As seen in FIGS. 1–4, a reversible dog coat 10 comprising a material blank 12, for ergonomically fitting about a neck and a back of a dog 70 (as best seen in FIG. 4) is disclosed. The material blank 12, best seen in FIGS. 1 and 2, has a top edge 14, a bottom edge 16, a first side edge 18, a second side edge 20, an upper portion 26, a middle portion 28, and a lower portion 30. The upper portion 26 extends outwardly from the middle portion 28 and is defined by the first side edge 18, the second side edge 20, and the top edge 14 with the top edge 14 being substantially concave. The upper portion 26 has a first arm 32 angularly protruding therefrom and a second arm 34 angularly protruding from the upper portion 26 and oriented opposite to the first arm 32. The middle portion 28 is disposed between the upper portion 26 and the lower portion 30 and is defined by the first side edge 18 and the second side edge 20. The middle portion 28 has a first leg 36 horizontally protruding therefrom and a second leg 38 horizontally protruding from the middle portion 28 and oriented opposite to the first leg 36. The first side edge 18 curvilinearly extends in the region between the first arm 32 and the first leg 36 between the upper portion 26 and the middle portion 28 and the second side edge 20 curvilinearly extends in the region between the second arm 34 and the second leg 38 between the upper portion 26 and the middle portion 28, defining a notch 40 for size adjustment about the neck of the dog 70 and for comfort. The lower portion 30 extends outwardly from the middle portion 28 and is defined by the first side edge 18, the second side edge 20, and the bottom edge 16 wherein the bottom edge 16 is substantially linear. The first side edge 18 linearly extends in the region between the first leg 36 and the bottom edge 16 and the second side edge 20 linearly extends in the region between the second leg 38 and the bottom edge 16 wherein the lower portion 30 being rectangular in shape.

The material blank 12 has four layers; a first layer 46 having a tightly woven exposed surface for weather and for wind resistance; a second layer 48 having a tightly woven unexposed surface; a third layer 50 having a highly insulative fill material disposed within a dead air space 58 defined by the first layer 46 and the second layer 48; and a fourth layer 52 having a water resistant and an insulative property.

Means for joining the first layer 46, the second layer 48, the third layer 50 and the fourth layer 52 together is achieved by sewing as indicated by a stitch 60 and by a seam 62. Means for attaching the material blank 12 to the dog 70, includes a hook fastener 44 and a loop fastener 42 strategically attached to the material blank 12 so that the first arm 32 and the second arm 34 adjustably encircles the neck of the dog 70, the first leg 36 and the second leg 38 adjustably encircles an abdomen of the dog 70 between the front legs and the rear legs thereby covering the back of the dog 70 from the neck to a tail, leaving the genitals of the dog 70 exposed while allowing the reversible dog coat 10 to be selectively reversed dependent upon the weather conditions and user preference.

The hook fastener 44 and the loop fastener 42 are dimensioned, for example, at about 3 inches in length, placed and fixed to an inside surface 22 and to an outside surface 24 of the material blank 12 such that the hook fastener 44 and the loop fastener 42 are selectively engageable in a mating relationship for reversibility and for size adjustment about the neck and the abdomen of the dog 70. The loop fastener 42 is fixed to the second arm 34 and to the second leg 38 of the first layer 46 and the hook fastener 44 is fixed to the first arm 32 and to the first leg 36 of the fourth layer 52.

The reversible dog coat 10 may be fabricated from readily available natural or synthetic materials by conventional fabrication techniques such as by sewing. For example, the material blank 12, may be cut from a pattern along an imaginary centerline generally defining an apron like shape for ergonomically fitting about a neck and a back of the dog 70. The first layer 46 and the second layer 48 are preferably fabricated from a nylon material chosen from the group consisting of rip stop and supplex, having about 250 to 350 threads per square inch. The third layer 50, preferably is sanitized goose down, is disposed within the dead air space 58 defined by the first layer 46 and the second layer 48; and the fourth layer 52 has a water resistant and an insulative property, preferably fleece such as DWR. As mentioned, the layers are joined together by sewing and are best seen in cross section in FIG. 3. Also, a seam 62, for retaining and for preventing the down from shifting and migrating, extends longitudinally from the top edge 14 to the bottom edge 16 of the material blank 12 and extends through the first layer 46, the second layer 48 and the third layer 50. One of an inner surface 54 and an outer surface 56 of the fourth layer 52 is attached to the second layer 48 by the stitch 60 disposed about a perimeter of the material blank 12 whereby the fourth layer 52 covering the seam 62 of the second layer 48 while the seam 62 on the first layer 46 is visible. The reversible dog coat 10 may be about 1½ inches to 2 inches in thickness and is launderable.

To use the reversible dog coat 10, a user simply places it on the body of the dog 70 shown in phantom in FIG. 4, and secures it thereto using the attaching means in a manner described above. As seen in FIG. 4, the outside surface 24 is visible. To reverse the reversible dog coat 10, the above process is repeated and the reversible dog coat 10, being oriented such that the inside surface 22 is visible.

After numerous attempts to discover the most cost effective combination of materials and construction methods, and after evaluating and testing numerous conventional dog coats commercially available and other earlier prototypes, the applicant has actually reduced the invention to practice according to the teachings of the invention and has successfully fabricated and tested a working prototype of the reversible dog coat 10 with favorable results.

The nylon used for the prototype is rip stop with a weave of about 250 threads per square inch. The fleece is DWR from Malden Mills which has superior water resistance and launderability. The down used is white goose down, which is a higher grade than gray goose or duck down, and which has the loft or ability to trap air better than feathers, which contributes to the warmth. The down is from the Pacific Coast Feather Company who is a noted leader in the industry because of their 'hyper cleaning' process which are highly sanitized, beyond legal cleaning standards, which eliminates the dirt and dander left in the down thereby eliminating any allergic reaction that the dog may experience. The tight weave of the nylon retained the white goose down without shedding, acted as a weather and wind barrier and also retained the dead air trapped there between the layers. The reversible dog coat 10, as fabricated, is about 1½ inches in thickness, offering a high thermal resistance to heat loss without sacrificing weight and functionality. Hook fastener 44 and loop fastener 42 are fixed to the material blank 12 as described above and are about 3 inches in length to allow for size adjustment of about 6 inches for fitting on a slightly larger animal.

During cold and damp weather tests, the inventor surprisingly discovered that, a Yorkshire Terrier, when fitted with the prototype, was able to tolerate longer periods of exposure to the elements than when not wearing the invention and when wearing a commercially available dog coat. The inventor further noted that the body of the dog 70, remained warm to the touch, did not mat the hair of the dog 70, did not fall off or shift, and kept the dog 70 warm and dry after the reversible dog coat 10 was removed, regardless of which position the reversible dog coat 10 was oriented and in all weather conditions. This was due entirely to the highly insulative, weather resistant materials chosen, the weave of the materials, the weight of the materials, the specific layers and number used, the thickness and orientation of the layers and the placement of the attaching means to insure proper fitting and to the particular construction for the intended purpose. Furthermore, when the dog was fitted with a commercially available dog coat for comparison, the animal was intolerant to the effects of the weather. Also, in addition to failing to provide adequate protection from the elements and comfort, the commercially available coat, as comparatively tested, did not properly fit on the dog 70 and twisted when the dog 70 ran about leaving the dog 70 exposed to the elements. The inventor also fabricated additional prototypes for use on large dogs such as a Golden Retriever, with similar positive results. The reversible dog coat 10, as tested, provided superior warmth and comfort to the dog 70 than any other conventional dog coat.

Surprisingly, the instant invention provides an added advantage and recognizes a problem and adequately and completely addresses an unfulfilled need, in that a reversible dog coat 10, in the manner disclosed, in effect, defines a highly functional reversible dog coat 10 that is warmer than conventional dog coats due entirely to the particular way the applicant fabricated the reversible dog coat 10 without having to increase the weight of the apparel to provide warmth and comfort.

The reversible dog coat 10 may be constructed in a wide variety of sizes and style variations to fit various sizes of dogs and may also be readily adaptable to fit other animals. For example, the first arm 16 and the second arm 18 of the 10 may each being greater in width than the width of each the first leg 20 and the second leg 22 of the reversible dog coat 10, so that the reversible dog coat 10 may be readily fitted to a Yorkshire Terrier, to a Chiwauwa, to a Golden Retriever or to any breed. It is understood that the reversible dog coat 10 may also have artistic decorations thereon without departing from the scope of this disclosure.

One practical advantage of the invention is that it provides a convenient, practical, low cost, reversible dog coat 10 which allows a user to conveniently selectively reverse the reversible dog coat 10 without sacrificing warmth and comfort and while still offering protection from the elements. Another advantage is that the reversible dog coat 10 may be size adjustable so that one size can fit a particular dog for a longer period of time while a dog grows. A further advantage of the invention is that the reversible dog coat 10 is designed for ease of manufacture by standard methods and by using readily available materials.

Of course, a wide variety of further uses and advantages of the present invention will become apparent to one skilled in the art.

As disclosed, it is apparent that the instant invention can provide other covering, fastening and decorative options for animals for use such as vests, sweaters and coats. One skilled in the art will realize that the foregoing discussion outlines the more important features of the invention to enable a better understanding of the instant invention and to instill a better appreciation of the inventor's contribution to the art. It must be clear that the disclosed details of construction, descriptions of geometry and illustrations of inventive concepts are mere examples of possible manifestations of the invention.

Although the invention has been shown and described with reference to certain illustrative embodiments, those skilled in the art undoubtedly will find alternative embodiments obvious after reading this disclosure. With this in mind, the following claims are intended to define the scope of protection to be afforded the inventor, and those claims shall be deemed to include equivalent constructions insofar as they do not depart from the spirit and scope of the present invention.

What is claimed is:

1. A reversible dog coat comprising:

a material blank, for ergonomically fitting about a neck and a back of a dog, said material blank having a top edge, a bottom edge, a first side edge, a second side edge, an upper portion, a middle portion, and a lower portion;

said upper portion extending outwardly from said middle portion and being defined by said first side edge, said second side edge, and said top edge wherein said top edge is substantially concave; said upper portion having a first arm angularly protruding therefrom and a second arm angularly protruding from said upper portion and oriented opposite to said first arm;

said middle portion disposed between said upper portion and said lower portion and being defined by said first side edge and said second side edge; said middle portion having a first leg horizontally protruding therefrom and a second leg horizontally protruding from said middle portion and oriented opposite to said first leg;

said first side edge curvilinearly extending in the region between said first arm and said first leg between said upper portion and said middle portion and said second side edge curvilinearly extending in the region between said second arm and said second leg between said upper portion and said middle portion, defining a notch for size adjustment about the neck of the dog and for comfort;

said lower portion extending outwardly from said middle portion and being defined by said first side edge, said second side edge, and said bottom edge wherein said bottom edge is substantially linear;

said first side edge linearly extending in the region between said first leg and said bottom edge and said second side edge linearly extending in the region between said second leg and said bottom edge wherein said lower portion being rectangular in shape;

said material blank having four layers; a first layer having a tightly woven exposed surface for weather and for wind resistance; a second layer having a tightly woven unexposed surface; a third layer having a highly insulative fill material disposed within a dead air space defined by said first layer and said second layer; and a fourth layer having a water resistant and an insulative property;

means for joining said first layer, said second layer, said third layer and said fourth layer together; and means for attaching said material blank to the dog so that said first arm and said second arm adjustably encircles the neck of the dog, said first leg and said second leg adjustably encircles an abdomen of the dog between the front legs and the rear legs thereby covering the back of the dog from the neck to a tail, leaving the genitals of the dog exposed while allowing said reversible dog coat to be selectively reversed dependent upon the weather conditions and user preference.

2. The reversible dog coat of claim 1 wherein said attaching means includes a hook fastener and a loop fastener strategically dimensioned, placed and fixed to an inside surface and to an outside surface of said material blank such that said hook fastener and said loop fastener selectively engageable in a mating relationship for reversibility and for size adjustment about the neck and the abdomen of the dog.

3. The reversible dog coat of claim 2 wherein said hook and said loop fastener each dimensioned to be at least 3 inches in length.

4. The reversible dog coat of claim 2 wherein said loop fastener fixed to said second arm and to said second leg of said first layer and said hook fastener fixed to said first arm and to said first leg of said fourth layer.

5. The reversible dog coat of claim 1 wherein said first and said second layer are fabricated from a nylon material chosen from the group consisting of rip stop and supplex.

6. The reversible dog coat of claim 1 wherein said first layer and said second layer are each fabricated from a material having about 250 to 350 threads per square inch.

7. The reversible dog coat of claim 1 wherein said highly insulative fill material of said third layer is down.

8. The reversible dog coat of claim 1 wherein said fourth layer is fleece.

9. The reversible dog coat of claim 1 wherein said means for joining said first layer, said second layer, said third layer and said fourth layer together is achieved by sewing.

10. The reversible dog coat of claim 9 further comprising a seam extending longitudinally from said top edge to said bottom edge of said material blank and extending through said first layer, said second layer and said third layer wherein said seam for retaining and for preventing said third layer from shifting and migrating.

11. The reversible dog coat of claim 10 wherein one of an inner surface and an outer surface of said fourth layer attached to said second layer by a stitch disposed about a perimeter of said material blank whereby said fourth layer covering said seam of said second layer while said seam on said first layer is visible.

12. The reversible dog coat of claim 1 wherein said first arm and said second arm each being substantially rectangular in shape.

13. The reversible dog coat of claim 1 wherein said first leg and said second leg each being substantially rectangular in shape.

14. The reversible dog coat of claim 1 wherein said first leg and said second leg each being larger in size than said first arm and said second arm.

15. The reversible dog coat of claim 1 wherein said first layer, said second layer, said third and said fourth layer together being about 1½ inches to 2 inches in thickness.

16. The reversible dog coat of claim 1 wherein said material blank is apron like in shape.

17. A reversible dog coat for covering a dog and for providing warmth and protection from the elements, said reversible dog coat comprising:

a material blank cut from a pattern along an imaginary centerline generally defining an apron like shape for ergonomically fitting about a neck and a back of the dog and having formed thereon a top edge, a bottom edge, a first side edge, a second side edge, an upper portion, a middle portion, and a lower portion;

said upper portion extending outwardly from said middle portion and being defined by said first side edge, said second side edge, and said top edge wherein said top edge is substantially concave; said upper portion having a first arm angularly protruding therefrom and a second arm angularly protruding from said upper portion and oriented opposite to said first arm;

said middle portion disposed between said upper portion and said lower portion and being defined by said first side edge and said second side edge; said middle portion having a first leg horizontally protruding therefrom and a second leg horizontally protruding from said middle portion and oriented opposite to said first leg;

said first side edge curvilinearly extending in the region between said first arm and said first leg between said upper portion and said middle portion and said second side edge curvilinearly extending in the region between said second arm and said second leg between said upper portion and said middle portion, defining a notch for size adjustment about the neck of the dog and for comfort;

said lower portion extending outwardly from said middle portion and being defined by said first side edge, said second side edge, and said bottom edge wherein said bottom edge is substantially linear;

said first side edge linearly extending in the region between said first leg and said bottom edge and said second side edge linearly extending in the region between said second leg and said bottom edge wherein said lower portion being rectangular in shape;

said material blank having four layers; a first layer having a tightly woven exposed surface for weather and for wind resistance; a second layer having a tightly woven unexposed surface; a third layer having a highly insulative natural fill material disposed within a dead air space defined by said first layer and said second layer; and a fourth layer having a water resistant and an insulative property;

a seam, extending longitudinally from said top edge to said bottom edge of said material blank and extending through said first layer, said second layer and said third layer wherein said seam for retaining and for preventing said third layer from shifting and migrating;

said first layer, said second layer, said third layer and said fourth layer joined together by sewing; and means for removably attaching said material blank to the dog so that when said material blank is placed on the dog, and when cooperatively engaged by said attaching means, said first arm and said second arm completely encircles the neck of the dog, said first leg and said second leg completely encircles the abdomen of the dog between the front legs and the rear legs and said middle portion disposed on the back of the dog so that said material blank is securely, adjustably, attached to the dog while allowing said reversible dog coat to be selectively reversed dependent upon the weather conditions and user preference.

18. The reversible dog coat of claim 17, wherein said attaching means includes a hook fastener and a loop fastener strategically dimensioned, placed and fixed to an inside surface and to an outside surface of said material blank such that said hook fastener and said loop fastener selectively engageable in a mating relationship for reversibility and for size adjustment about the neck and the abdomen of the dog.

19. The reversible dog coat of claim 18 wherein said loop fastener fixed to said second arm and to said second leg of said first layer and said hook fastener fixed to said first arm and to said first leg of said fourth layer.

20. A method of making a reversible dog coat comprising the steps of:

providing a material blank, cut from a pattern along an imaginary centerline generally defining an apron like shape for ergonomically fitting about a neck and a back of a dog, with a top edge, a bottom edge, a first side edge, a second side edge, an upper portion, a middle portion, and a lower portion wherein said upper portion extending outwardly from said middle portion and said upper portion being defined by said first side edge, said second side edge, and said top edge wherein said top edge being substantially concave and said upper portion having a first arm angularly protruding therefrom and a second arm angularly protruding from said upper portion and oriented opposite to said first arm; said middle portion disposed between said upper portion and said lower portion and said middle portion being defined by said first side edge and by said second side edge; wherein said middle portion having a first leg horizontally protruding therefrom and a second leg horizontally protruding from said middle portion and oriented opposite to said first leg; said first edge curvilinearly extending in the region between said first arm and said first leg between said upper portion and said middle portion and said second side edge curvilinearly extending in the region between said second arm and said second leg between said upper portion and said middle portion, defining a notch for size adjustment about the neck of the dog and for comfort; said lower portion extending outwardly from said middle portion and defining said lower portion by said first side edge, said second side edge, and said bottom edge wherein said bottom edge is substantially linear; said first side edge linearly extending in the region between said first leg and said bottom edge and said second side edge linearly extending in the region between said second leg and said bottom edge wherein said lower portion being rectangular in shape;

providing said material blank with four layers; a first layer having a tightly woven exposed surface for weather and for wind resistance; a second layer having a tightly woven unexposed surface; a third layer having a highly insulative fill material disposed within a dead air space defined by said first layer and said second layer; and a fourth layer having a water resistant and an insulative property; providing a seam extending longitudinally from said top edge to said bottom edge of said material blank and extending through said first layer, said second layer and said third layer;

joining said first layer, said second layer, said third layer and said fourth layer together by sewing; and providing means for attaching said material blank to the dog so that said first arm and said second arm of said material blank adjustably encircles the neck of the dog, said first leg and said second leg adjustably encircles an abdomen of the dog between the front legs and the rear legs allowing said reversible dog coat to be selectively reversed.

\* \* \* \* \*